United States Patent [19]
Powell

[11] Patent Number: 5,090,780
[45] Date of Patent: Feb. 25, 1992

[54] BINARY WEIGHTED DIGITAL FLOW REGULATING SYSTEM

[75] Inventor: Terry D. Powell, Fort Wayne, Ind.

[73] Assignee: Westinghouse Air Brake Company, Spartanburg, S.C.

[21] Appl. No.: 695,079

[22] Filed: May 3, 1991

[51] Int. Cl.⁵ .............................................. B60T 15/14
[52] U.S. Cl. ........................................ 303/15; 303/20; 303/DIG. 3
[58] Field of Search ................... 303/15, 2, 3, 101, 20, 303/DIG. 3, 8, 9.61, 13, 16, 17, 101

[56] References Cited
U.S. PATENT DOCUMENTS
4,904,027 2/1990 Skantar et al. ..................... 303/15

Primary Examiner—Douglas C. Butler
Attorney, Agent, or Firm—G. J. Falce

[57] ABSTRACT

A binary weighted digital fluid flow regulating arrangement including a microprocessor responsive to a brake command controller for initiating the energization and deenergization of select ones of a plurality of parallel connected electromagnetic flow control valves which have orifice diameters that are successively proportioned by a power of two.

20 Claims, 2 Drawing Sheets

5,090,780

BINARY WEIGHTED DIGITAL FLOW REGULATING SYSTEM

FIELD OF THE INVENTION

This invention relates to a digital fluid flow control system and more particularly to a binary regulating arrangement for digitally controlling the flow of fluid from a supply source to a working load by selective opening and closing a plurality of parallel connected valves in which the orifice diameters are progressively proportioned by a power or base of two.

BACKGROUND OF THE INVENTION

In the past, it was common practice to control or regulate the flow of fluid, namely, gas or liquid by varying the opening of an electrically operated analog valve device. That is, the size of the orifice was progressive and proportionally increased or decreased by the rotational movement of an operating stem of a stepper motor or by the relative linear movement of a plunger of a force solenoid. For example, these previous electrically-actuated mechanically operated devices continuously varied a restrictive valve seat, a butterfly disc or shuttle blades to control or regulate the rate of flow of fluid from a pressure source to a working load. These variable orifice types of valve devices are relatively complex which require sophisticated electrical and electronic control equipment as well as intricate sensing instrumentation which effectively senses the exact position and/or size of the orifice opening at any given time. In addition to the inherent complexity, an analog valve must be carefully designed and fastidiously constructed in order to ensure that the valve will assume a more restrictive condition during a critical failure. That is, the valve must operate in a fail-safe manner, particularly when used in a railway and automotive braking application. The precarious combination of both mechanical and electronic commixture renders these former flow control or regulating arrangements both cost ineffective and highly complex. In addition, the operating time to go from a zero (0) flow rate to a hundred percent (100%) flow rate, and vice-versa, is relatively long since an analog regulating device must pass throughout the complete range from a fully closed to a fully open position.

OBJECTS AND SUMMARY OF THE INVENTION

Accordingly, it is an object of this invention to provide a new and improved digital fluid control arrangement which has a uniform response time for any selected flow rate.

Another object of this invention is to provide a binary weighted digital flow regulator for discretely controlling the rate of fluid flow from a source to a load.

A further object of this invention is to provide a fluid flow control system employing a plurality of parallel, binary operated valves to selectively establish a different flow rate.

Yet another object of this invention is to provide an electronically controlled regulating system for selecting a given one of a plurality of flow rates by selectively opening and closing specific electromagnet valves.

Still another object of this invention is to provide a control device for regulating the flow of a pressurized fluid in a variable manner by using a number of electromagnetic valves which have assigned capacities according to a power of two (2).

Still a further object of this invention is to provide a binary fluid flow control system which has the ability to select a flow rate in increments equal to the flow rate of the orifice of the smallest valve.

An additional object of this invention is to provide a binary weight digital flow control system employing a plurality of graduated electromagnetic valves located in line with a control valve which is connected to a source of pressure in which the valves are switched ON and OFF in a proper sequence by a microprocessor to vary the flow rate to an operating load.

In addition, it is an object of this invention to provide a binary weighted digital fluid flow control system comprising means for electrically initiating a desired brake command signal, means responsive to the desired brake command signal for pneumatically establishing a given flow rate from a supply source to an operating load by selectively energizing and deenergizing a plurality of electromagnetic valves which have orifice areas that are successively proportioned by a power of two.

Additionally, it is an object of this invention to provide a binary regulating arrangement for digitally controlling the flow rate from a pressurized reservoir to a vehicle brake cylinder comprising, a brake command controller for converting selected brake positions into corresponding electrical signals, a two-position three-way control magnet valve connectable to the pressurized reservoir and connectable to atmosphere, a plurality of parallel connected two-way magnet valves connectable between the two-position three-way control valve and a vehicle brake cylinder, a electropneumatic transducer for sensing the pressure in the vehicle brake cylinder and for providing a feedback signal, a microprocessor means for receiving the corresponding electrical signals from said brake command controller to cause the energization of the two-position three-way control magnet valve and to cause the select energization of certain ones of the plurality of parallel two-way magnet valves to pressurize the vehicle brake cylinder in accordance with the selected brake position, and the electropneumatic transducer feeding back an electrical signal to the microprocessor means for checking whether the pressure in the vehicle brake cylinder has reached the desired level.

DESCRIPTION OF THE DRAWINGS

The above objects and other attendant features and advantages will be more readily appreciated as the present invention becomes better understood by reference to the following detailed description when considered in conjunction with the accompanying drawings, wherein.

DETAILED DESCRIPTION OF THE INVENTION

Figure 1:
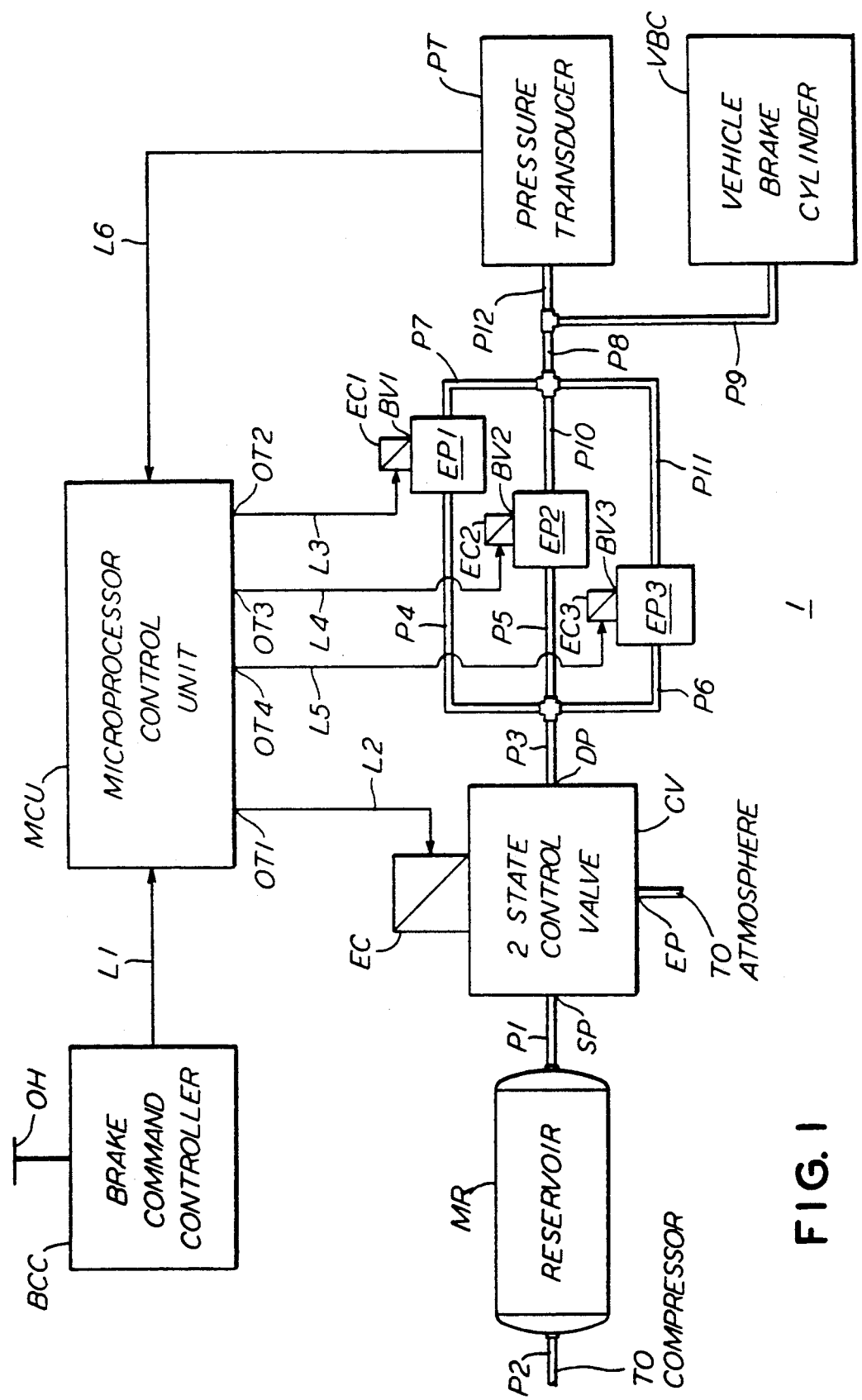
FIG. 1 is a diagrammatic illustration of binary weighted digital fluid flow regulating system for controlling the pressure supplied to the air brake cylinder for railway vehicles in accordance with the present invention.

Referring now to the drawings, and in particular to FIG. 1, there is shown a first embodiment of a binary weighted digital fluid flow regulating system of the electropneumatic brake control system for railway vehicles generally characterized by numeral 1. As shown, a brake command controller BBC includes an operating handle or lever OH which is located within easy reach of the engineer or train operator. The operating handle OH is manually rotated or moved to one of a plurality of selected positions to initiate the desired braking level or brake command request. The particular position of the rotatable handle OH is converted into an electrical signal by a suitable encoding device or the like. At least with respect to the brake functions, the control of the locomotive and train is traditionally concentrated at a single point in the cab of the lead car or locomotive. It will be appreciated that other types of brake control operators, such as, toggles, joysticks, keypads, and pushbuttons, may be used in place of the rotary handle OH if preferred, and in cases where the cab arrangement permits.

It will be seen that the output signal of the encoder of the brake command controller BCC is conveyed to the input of a programmable microcomputer or microprocessor control unit MCU via lead L1. The microprocessor control unit MCU includes a timer which is started and after the expiration of a given period of time, the main program of the microprocessor MCU is activated to carry out the braking function. The microprocessor MCU may be a low power CMOS central processing unit such as NSC800 manufactured and sold by National Semiconductor Corporation of Santa Clara, Calif., or M68000 microprocessor unit manufactured and marketed by Motorola Inc. of Phoenix, Ariz. The microprocessor unit is an 8-bit CMOS central processor having interrupt control, flag flip-flop, automatic logic unit, instruction register, instruction decoder and machine cycle encoding timing and control register array, address buffer, and data/address buffer. The microprocessor unit MCU includes an internal clock generator which is driven by an external crystal having a frequency which is twice the operating frequency of the microprocessor MCU. Thus, the microprocessor MCU provides the capabilities of performing a random number of functions by utilizing the memory storage, computation and timing features in addition to executing the normal real time control functions.

As shown in FIG. 1, at least four (4) outputs are derived from the microprocessor control unit MCU. A first output terminal OT1 is connected to the electrical coil EC of a commercially available two-state control or two-position, three-way electropneumatic or electromagnetic valve CV via lead L2. When the solenoid coil EC is deenergized, a spring biased check valve causes the blocking off of the flow path between the supply port SP and the delivery port DP and establishes a flow path between the delivery port DP and the exhaust EP. Conversely, when the solenoid coil EC is energized, the check valve establishes a flow path between the supply port SP and the delivery port DP and blocks off the exhaust port EP which is connected to atmosphere.

It will be seen that the supply port SP of the two-position, three-way control valve CV is pneumatically connected to the output of a source of pressurized air or main reservoir MR via conduit or pipe P1. The air pressure in the main reservoir MP is maintained at a desired psig level by being connected by conduit or pipe P2 to a suitable air compressor (not shown). It will be noted that the delivery port DP is pneumatically connected to the respective inputs of a plurality of parallel connected two-way normally closed electromagnetic valves BV1, BV2, and BV3. That is, the input of the first one of the three valves BV1 is connected to delivery port DP via conduits or pipes P3 and P4, while the input of the second one of the three valves BV2 is connected to delivery port DP via conduits or pipes P3 and P5. The input of the third one of the three valves BV3 is connected to the delivery port DP via conduits or pipes P3 and P6. It will be appreciated that the three parallel connected valves BV1, BV2 and BV3 are simply ON-OFF pneumatic devices which are substantially identical in construction with exception of their orifice diameters which will be described in greater detail hereinafter. The three valves BV1, BV2, and BV3 may be of the type of spring-biased solenoid-operated valves manufactured and marketed by Skinner Valve, a Honeywell Division, of New Britain, Conn. As shown, the first normally closed valve BV1 includes an electrical coil or solenoid EC1 and a pneumatic portion EP1 which is connected to a vehicle brake cylinder VBC via conduits or pipes P7, P8 and P9. Similarly, the second normally closed valve BV2 includes a solenoid or electrical coil EC2 and a pneumatic portion EP2 which is connected to the vehicle brake cylinder VBC via conduits or pipes P10, P8, and P9. Likewise, the third normally closed valve BV3 includes a solenoid or electrical coil EC3 and a pneumatic portion EP3 which is connected to the vehicle brake cylinder VBC via conduits or pipes P11, P8, and P9. It will be seen that the pipes P8 and P9 leading to the vehicle brake cylinder VBC are pneumatically connected to a pressure transducer or sensor PT via conduit or pipe P12. The pressure sensor PT may be a commercially available electropneumatic transducer such as a model 206 variable capacitance sensor manufactured and marketed by Setra Systems, Inc. of Acton, Mass. The change in pressure in the vehicle brake cylinder VBC causes a deformation of a diaphragm to vary the capacitance value. The change in capacitance is detected and converted to a highly accurate liner electrical signal which is fed back to the microprocessor MCU via the lead L6. Thus, the pressure level is constantly monitored and checked by the pressure transducer PT which provides a feedback signal to the microprocessor MCU to confirm that the railway vehicle is being subjected to the appropriate braking in accordance with the binary signals emitted by the microprocessor MCU.

It will be noted that the electrical coil EC1 of the first valve BV1 is connected to the second output terminal OT2 of the microprocessor MCU via output lead L3 while the electrical coil EC2 of the second valve BV2 is connected to the microprocessor MCU via output lead L4. Similarly, the electrical coil EC3 of the third valve BV3 is connected to the output terminal OT4 of the microprocessor MCU via lead L5. As previously mentioned, the three flow control valves BV1, BV2 and BV3 are substantially identical in construction with the exception of the sizes or diameters of their fluid passing orifices. In practice, the areas of the respective orifices of the three successive regulating valves are increased in multiple of two (2). For example, if the total area of the three valve orifices is equal to A, then the orifice area of valve BV1 is selected to be equal to 1/7A, and the orifice area of valve BV2 is selected to be equal to 2/7A while the orifice area of valve BV3 is selected to be equal to 4/7A.

Thus, the following table illustrates how the three valves BV1, BV2, and BV3 may be turned ON and OFF to control the fluid flow rate conveyed to the vehicle brake cylinder VBC.

TABLE 1

| TOTAL FLUID FLOW ORIFICE AREA | STATE OF 1/7A VALVE BV1 | STATE OF 2/7A VALVE BV2 | STATE OF 4/7A VALVE BV3 |
| --- | --- | --- | --- |
| 0 (Fully Closed) | "0" | "0" | "0" |
| 1/7A | "1" | "0" | "0" |
| 2/7A | "0" | "1" | "0" |
| 3/7A | "1" | "1" | "0" |
| 4/7A | "0" | "0" | "1" |
| 5/7A | "1" | "0" | "1" |
| 6/7A | "0" | "1" | "1" |
| 7/7A (Fully Opened) | "1" | "1" | "1" |

The binary representation of "0" signifies that the particular valve is deenergized or is turned OFF by the microprocessor MCU while the binary representation of "1" signifies that the particular valve is energized or is turned ON by the microprocessor MCU. Thus, the flow rate may be discreetly controlled in eight steps or graduations by selectively turning the valves BV1, BV2, and BV3 ON or OFF to open or close the orifices of the regulating valves. It will be appreciated that the response time for varying the fluid flow rate is enhanced since the switching time or period is the same for all orifice selections. That is, the switching time from a fully closed orifice condition to a fully open orifice condition and vice versa is the same as that of all other orifice selection positions. The use of the flow regulator valves BV1, BV2 and BV3 in combination with the control valve CV is capable of performing a lap function and therefore the control valve CV will be less complicated since it can simply be a two (2) state device rather than a three (3) state device as was previously required with analog brake control arrangements.

Figure 2:
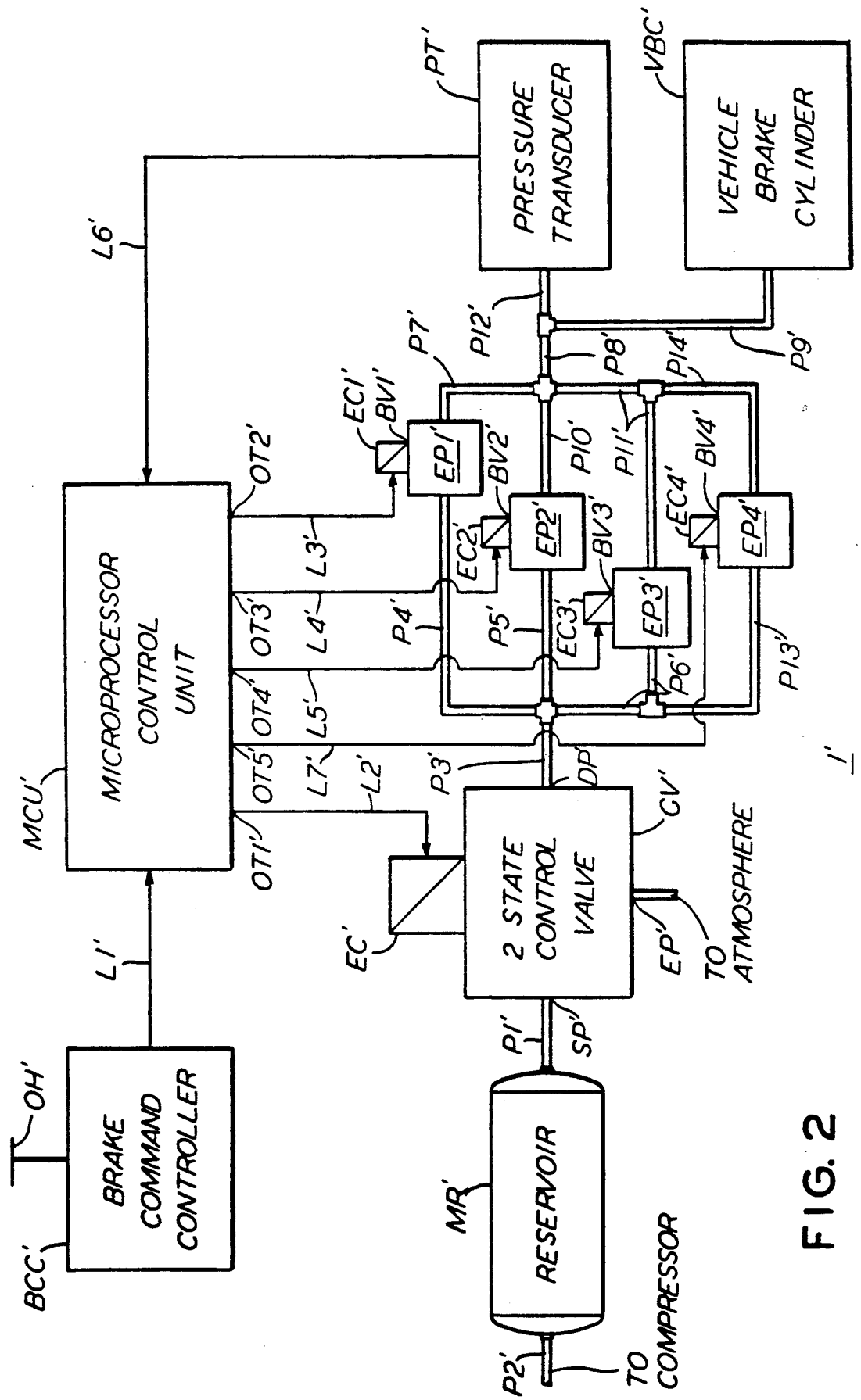
FIG. 2 is a diagrammatic illustration of an alternate embodiment of the fluid flow regulating arrangement in accordance with the present invention.

Referring now to FIG. 2, there is shown a second embodiment of a binary weighted digital fluid flow control arrangement of the electropneumatic brake control system for railway vehicles generally characterized by numeral 1'. It will be seen that a brake command controller BCC' including an operating handle or lever OH' is located within easy reach of the train operator or engineer. The operating handle OH is manually rotated or moved to one of a plurality of selected positions to initiate the desired brake command request. The selected brake position of the rotatable handle OH' is converted into an electrical signal by a suitable position encoder contained by the brake command controller BCC'. In regard to the brake functions, the control of the locomotive consist is traditionally concentrated at a single point in the cab of the lead vehicle or front locomotive of the train. It will be appreciated that the electrical output signal of the encoding device of the brake command controller BCC' is conveyed to the input of a programmable microprocessor control unit MCU' via lead L2'. Like the microprocessor MCU, the microprocessor MCU' includes the capabilities of performing a random number of different functions by utilizing storage, computation, and timing features in addition to executing the normal real time control functions.

In viewing FIG. 3, it will be seen that the microprocessor MCU' is capable of producing at least five (5) outputs. The first output terminal OT1' is connected to the electrical coil EC' of a two (2) state control valve CV' via L2'. When the solenoid coil EC' is deenergized, a spring-biased check valve causes the blocking off of the flow path between the supply port SP' and the delivery port DP' and establishes communication between the delivery port DP' and the exhaust port EP'. Conversely, when the solenoid coil EC' is energized, the check valve is shifted such that it establishes a flow path between the supply port SP' and the delivery port DP' and blocks off the exhaust port EX'.

It will be noted that the supply port SP' of the two-state three-way control valve CV' is pneumatically connected to the output of a main pressure reservoir MR' via a conduit or pipe P1'. The pressurized air in the main reservoir MR' is maintained at a desired psig level by a suitable air compressor (not shown) which is connected to the input of the main reservoir MR' via conduit or pipe P2'. It will be seen that the delivery port DP' is pneumatically connected to the respective inputs of a plurality of parallel connected two-way normally closed electromagnetic valves BV', BV2', BV3', and BV4'. That is, the input of the first one of the four valves BV1' is connected to the delivery port DP' via conduits or pipes P3', and P4' while the second one of the four valves BV2' is connected to the delivery port DP' via conduits or pipes P3' and P5' The input to the third one of the four valves BV3' is connected to the delivery port DP' via conduits or pipes P3' and P6' while the fourth one of the four valves BV4' is pneumatically connected to the delivery port DP' via conduits or pipes P3', P6' and P13'. As shown, the first normally closed solenoid valve BV1' includes an electrical coil EC1' and a pneumatic portion EP1' which is connected to a vehicle brake cylinder VBC' via conduits or pipes P7', P8' and P9'. Similarly, the second normally closed valve BV2 includes an electrical coil or solenoid EC2' and a pneumatic portion EP2' which is connected to the vehicle brake cylinder VBC' via conduits or pipes P10', P8' and P9'. Likewise, the third normally closed solenoid valve BV3' includes an electrical coil EC3' and a pneumatic portion EP3' which is connected to the vehicle brake cylinder via conduits or pipes P11', P8' and P9'. Further, it will be seen that the third normally closed valve BV4' includes a solenoid or electrical coil EC4' and a pneumatic portion EP4' which is connected to the vehicle brake cylinder via conduits or pipes P14', P11', P8' and P9'. As shown, the supply pipes P8' and P9' leading to the vehicle brake cylinder BVC' are pneumatically connected to a pressure sensing transducer PT', such as a type 206 made by Setra Systems, Inc. In practice, the change in pressure in the vehicle brake cylinder BVC' which is conveyed via pipes P8' and P9' causes a deformation of a diaphragm which varies the value of a capacitor. The change in capacitance is detected and converted into an electrical signal which is fed back to the microprocessor MCU' via lead L6' Accordingly, the pressure supplied to the vehicle brake cylinder VBC' is continually monitored and checked to ensure that the railway vehicle is being appropriately braked in accordance with the brake demand established by the brake command controller BCC'. Thus, the feedback signal on lead L6' is conveyed to the microprocessor MCU' to confirm that the vehicle is being properly braked in accordance with brake request of the engineer.

As shown, the electrical coil EC1' of the first regulating valve BV1' is connected to the second output terminal OT2' of the microprocessor MCU' via lead L3' while the electrical coil EC2' of the second regulating valve BV2' is connected to the third output terminals OT3' of the microprocessor MCU' via lead L4'. Similarly, the electrical coil EC3' of the third regulating valve BV3' is connected to the fourth output terminals OT4' of the microprocessor MCU' via lead L5' while the electrical coil EC4' of the fourth regulating valve BV4' is connected to the fifth output terminal OT5' of the microprocessor MCU' via lead L7'. As mentioned above, the flow control valves BV', BV2', BV3', and BV4' are substantially identical in construction with the exception of open areas or diameters of the fluid passing orifices. In practice, the open areas of the orifices of the four successive regulating valves are arranged to be increased by a power of two (2). Again, if the total area of the four valve orifices is equal to A, then the orifice of valve BV1' is selected to be equal to 1/15A, the orifice of valve BV2' is selected to be 2/15A, the orifice of valve BV3' is selected to be 8/15A.

Thus, the following table illustrates how the four regulating valves BV1',BV2', BV3', and BV4' may be turned ON and OF to control the fluid flow rate conveyed to the brake cylinder VBC'.

TABLE 2

| TOTAL FLUID FLOW ORIFICE AREA | STATE OF 1/15A VALVE BV1' | STATE OF 2/15A VALVE BV2' | STATE OF 4/15A VALVE BV3' | STATE OF 8/15A VALVE BV4' |
|---|---|---|---|---|
| 0 (Fully Closed) | "0" | "0" | "0" | "0" |
| 1/15A | "1" | "0" | "0" | "0" |
| 2/15A | "0" | "1" | "0" | "0" |
| 3/15A | "1" | "1" | "0" | "0" |
| 4/15A | "0" | "0" | "1" | "0" |
| 5/15A | "1" | "0" | "1" | "0" |
| 6/15A | "0" | "1" | "1" | "0" |
| 7/15A | "1" | "1" | "1" | "0" |
| 8/15A | "0" | "0" | "0" | "1" |
| 9/15A | "1" | "0" | "0" | "1" |
| 10/15A | "0" | "1" | "0" | "1" |
| 11/15A | "1" | "1" | "0" | "1" |
| 12/15A | "0" | "0" | "1" | "1" |
| 13/15A | "1" | "0" | "1" | "1" |
| 14/15A | "0" | "1" | "1" | "1" |
| 15/15A (Fully Opened) | "1" | "1" | "1" | "1" |

As previously noted, a binary "0" represents that the particular regulating valve is deenergized or turned OFF by the microprocessor MCU' while the binary "1" represents that the particular regulating valve is energized or turned OFF by the microprocessor MCU'. Accordingly, the flow rate may be selectively controlled in 16 discrete steps by energizing and/or deenergizing the regulating valves BV1', BV2', BV3', and BV4'. Again, the response time for switching the regulating valves from one step to any other step is exactly the same so that a change in the flow rate occurs almost instantaneously.

Thus, the present invention has been described in such full, clear, concise, and exact terms as to enable any person skilled in the art to which it pertains to make and use the same, and having set forth the best mode contemplated of carrying out this invention. I state that the subject matter, which I regard as being my invention, is particularly pointed out and distinctly asserted in what is claimed. It will be understood that various alterations and changes may be made by those skilled in the art without departing from the spirit and scope of the subject invention. For example, the number of parallel connected regulating valves be increased or decreased in accordance with the desired number of discrete steps of the required flow rates which are to be fed to the vehicle brake cylinder. Therefore, it will be appreciated that certain modifications, ramifications, and equivalents will be readily apparent to persons skilled in the art, and accordingly it is understood that the present invention should not be limited to the exact embodiment shown and described, but should be accorded the full scope and protection of the appended claims.

I claim:

1. A binary weighted digital fluid flow control system comprising, means for electrically initiating a desired brake command signal, means responsive to the desired brake command signal for pneumatically establishing a given flow rate from a supply source to an operating load by selectively energizing and deenergizing a plurality of electromagnetic valves which have orifice areas that are successively proportioned by a power of two.

2. The binary weighted digital fluid flow control system, as defined in claim 1, wherein said initiating means is a brake command controller.

3. The binary weighted digital fluid flow control system, as defined in claim 1, wherein said responsive means is a microprocessor control unit.

4. The binary weighted digital fluid flow control system, as defined in claim 1, wherein a two-position, three-way solenoid valve is interposed between said supply source and said plurality of electromagnetic valves.

5. The binary weighted digital fluid flow control system, as defined in claim 1, wherein said operating load is a pneumatically operated brake cylinder.

6. A binary weighted digital fluid flow control system, as defined in claim 1, wherein each of said plurality of electromagnetic valves is a two-way normally closed solenoid valve.

7. The binary weighted digital fluid flow control system, as defined in claim 5, wherein a pressure to electrical transducer senses the pressure in said brake cylinder and provides a feedback signal to said responsive means.

8. The binary weighted digital fluid flow control system, as defined in claim 1, wherein the orifice area of a first one of said plurality of electromagnetic valves is 1/7A: where A is the total orifice area of three electromagnetic valves.

9. The binary weighted digital fluid flow control system, as defined in claim 8, wherein the orifice area of a second one of said plurality of electromagnetic valves is 2/7A.

10. The binary weighted digital fluid flow control system, as defined in claim 1, wherein the orifice area of a third one of said plurality of electromagnetic valves is 4/7A.

11. The binary weighted digital fluid flow control system, as defined in claim 1, wherein the orifice area of successive ones of said plurality of electromagnetic valve is equal to $AVn \times 2^{(n-1)}$: where A is the total area of all of said plurality of electromagnetic valves, and n is the number of said plurality of electromagnetic valves.

12. The binary weighted digital fluid flow control system, as defined in claim 1, wherein the orifice area of a first one of said plurality electromagnetic valves is 1/15A; where A is the total surface area of four electromagnetic valves.

13. The binary weighted digital fluid flow control system, as defined in claim 12, wherein the orifice area of a second one of said plurality of electromagnetic valves is 2/15A.

14. The binary weighted digital fluid flow control system, as defined in claim 13, wherein the orifice area of a third one of said plurality of electromagnetic valves is 4/15A.

15. The binary weighted digital fluid flow control system, as defined in claim 14, wherein the orifice area of a fourth one of said plurality of electromagnetic valves is 8/15A.

16. A binary regulating arrangement for digitally controlling the flow rate from a pressurized reservoir to a vehicle brake cylinder comprising, a brake command controller for converting selected brake positions into corresponding electrical signals, a two-position, three-way control magnet valve connectable to the pressurized reservoir and connectable to atmosphere, a plurality of parallel connected two-way magnet valves connectable between said two-position, three-way control valve and the vehicle brake cylinder an electropneumatic transducer for sensing the pressure in said vehicle brake cylinder and for providing a feedback signal, a microprocessor means for receiving the corresponding electrical signals from said brake command controller to cause the energization of said two-position, three-way control magnet valve and to cause the select energization of certain ones of said plurality of parallel two-way magnet valves to pressurize said vehicle brake cylinder in accordance with the selected brake position, and said electropneumatic transducer feeding back an electrical signal to said microprocessor means for checking whether the pressure in said vehicle brake cylinder has reached the desired level.

17. The binary regulating arrangement, as defined in claim 16, wherein said plurality of parallel connected two-way magnet valves have orifice diameters which are successively graduated in a power of two.

18. The binary regulating arrangement, as defined in claim 16, wherein said plurality of parallel connected two-way magnet valves includes three normally closed solenoid valves.

19. The binary regulating arrangement, as defined in claim 16, wherein said plurality of parallel connected two-way magnet valves includes four normally closed solenoid valves.

20. The binary regulating arrangement, as defined in claim 16, wherein said plurality of parallel connected two-way magnet valves includes at least two normally closed solenoid valves.

* * * * *